April 10, 1951 R. C. CRONK 2,548,422
PLIERS
Filed Aug. 15, 1949

INVENTOR.
Richard C. Cronk
BY Harry D. Kilgore
Attorney

Patented Apr. 10, 1951

2,548,422

UNITED STATES PATENT OFFICE 2,548,422

PLIERS

Richard Charles Cronk, Hudson, Wis.

Application August 15, 1949, Serial No. 110,335

1 Claim. (Cl. 30—142)

My present invention relates to improvements in pliers intended for general use but especially designed for sportsmen and more particularly, fishermen.

As an important adjunct to the tackle box, fishermen have long felt the need of a pair of pliers especially adapted to cut a fish hook to facilitate its removal from a caught fish or from a person accidentally hooked; for applying or removing from a fish line, sinkers particularly of the split-shot type or wrap around type, and for cutting the latter type to produce a sinker of the desired weight; and for other purposes too numerous to mention, in camp, at home, or in the shop.

The principal object of this invention is to provide a pair of pliers having novel cutting blades.

To the above end, the invention consists of the novel construction and arrangement of parts hereinafter described and defined in the claim.

In the accompanying drawing, which illustrates the invention, like characters indicate like parts throughout the several views.

Referring to the drawing.

Figure 1:
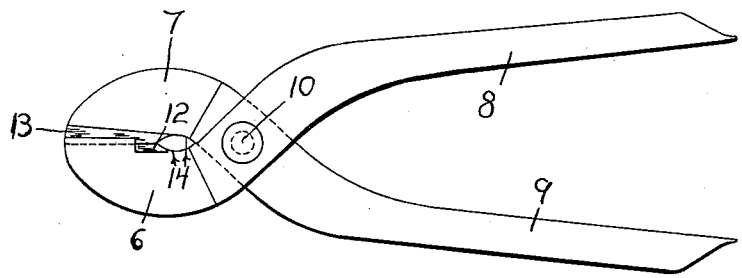
Fig. 1 is a side elevational view of the improved pliers in which the jaws are in a closed position.
Figure 2:
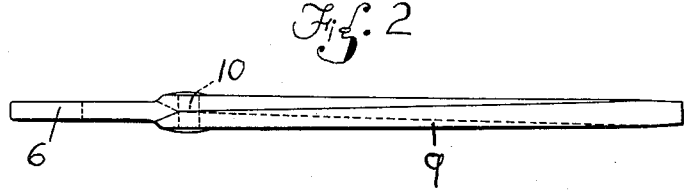
Fig. 2 is a plan view of the same.
Figure 3:
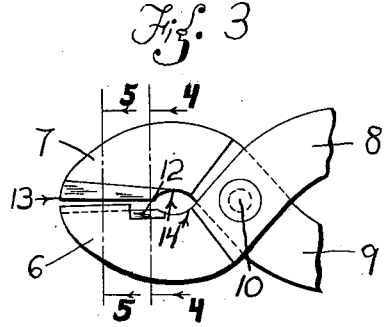
Figure 4:
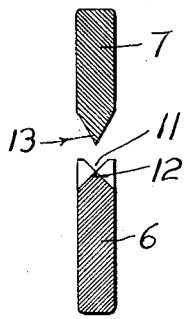
Figure 5:
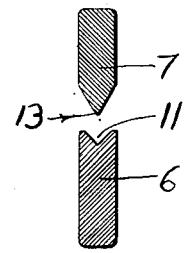

Fig. 3 is a fragmentary side elevational view of the improved pliers showing the jaws partly open; and Figs. 4 and 5 are transverse views in section taken on the lines 4—4 and 5—5 of Fig. 3, respectively, on an enlarged scale.

The numerals 6 and 7 indicate a pair of jaws integral with a pair of handles 8 and 9 in crossed arrangement, and pivotally connected at 10. The jaws 6 and 7 are relatively flat and in the same plane. In the working face of the jaw 6 is a longitudinal groove 11 that is V-shaped in cross-section and extends inwardly from the outer extremity of said jaw. The jaw 6 is also provided with a cutting blade 12 that is V-shaped in cross-section and extends inwardly of the inner end portion of the groove 11. The edge of the blade 12 is substantially in the plane of the bottom of said groove.

The jaw 7, is provided on its working face, with a cutting blade 13 that extends from the outer extremity of said jaw to substantially the inner end of the cutting blade 12.

Formed in the jaws 6 and 7, rearwardly of the cutting blades 12 and 13, is a pair of cooperating, opposing, work engaging notches 14 that are formed on the arcs of circles. These notches 14, when the jaws 6 and 7 are in closed position, substantially form an oval.

When the jaws 6 and 7 are closed, the forward portion of the cutting blade 12 seats in the groove 11, and that portion of the cutting edge of said blade, rearwardly of the groove 11, contacts the cutting edge of the cutting blade 13.

Obviously, the cutting blades 12 and 13, are so arranged as to produce a cutting action and particularly to sever a fish hook to facilitate its removal from flesh in which it may accidentally be embedded by permitting the fish hook to be drawn through said flesh without further damage by either the barb or the eye.

What I claim is:

A tool of the class described, comprising a pair of pivotally connected jaws having operating handles, one of the jaws having in its working face, at its outer extremity, a longitudinal V-shaped groove, and rearwardly of said groove, a V-shaped cutting blade, the edge of which is substantially in the plane of the bottom of the groove, the other jaw having on its working face, a V-shaped blade that extends substantially from the outer extremity of the respective jaws, to the inner end of the first noted blade.

RICHARD CHARLES CRONK.

No references cited.